(12) United States Patent
Gonzalez et al.

(10) Patent No.: US 11,682,944 B2
(45) Date of Patent: Jun. 20, 2023

(54) AXIAL MAGNETIC BEARING FOR CENTRIFUGAL REFRIGERANT COMPRESSOR

(71) Applicant: DANFOSS A/S, Nordborg (DK)

(72) Inventors: Delvis Anibal Gonzalez, Tallahassee, FL (US); Lin Xiang Sun, Tallahassee, FL (US)

(73) Assignee: DANFOSS A/S (DK)

( * ) Notice: Subject to any disclaimer, the term of this patent is extended or adjusted under 35 U.S.C. 154(b) by 0 days.

(21) Appl. No.: 17/791,586

(22) PCT Filed: Feb. 20, 2020

(86) PCT No.: PCT/US2020/019043
§ 371 (c)(1),
(2) Date: Jul. 8, 2022

(87) PCT Pub. No.: WO2021/167613
PCT Pub. Date: Aug. 26, 2021

(65) Prior Publication Data
US 2022/0385138 A1 Dec. 1, 2022

(51) Int. Cl.
*H02K 7/09* (2006.01)
*F16C 32/04* (2006.01)
*F25B 31/02* (2006.01)

(52) U.S. Cl.
CPC .......... *H02K 7/09* (2013.01); *F16C 32/0465* (2013.01); *F25B 31/026* (2013.01)

(58) Field of Classification Search
CPC ...... H02K 7/08; F16C 32/0456; F15B 31/026
(Continued)

(56) References Cited

U.S. PATENT DOCUMENTS 5,576,587 A 11/1996 Takahashi et al.
5,924,847 A 7/1999 Scaringe et al.
(Continued)

FOREIGN PATENT DOCUMENTS

WO 2010141815 A2 12/2010

OTHER PUBLICATIONS

International Search Report and Written Opinion for PCT/2020/019043 dated May 20, 2020.
(Continued)

*Primary Examiner* — Terrance L Kenerly
(74) *Attorney, Agent, or Firm* — Carlson, Gaskey & Olds, P.C.

(57) ABSTRACT

This disclosure relates to an axial magnetic bearing for a centrifugal refrigerant compressor, and a corresponding system and method. A centrifugal refrigerant compressor system according to an exemplary aspect of the present disclosure includes, among other things, an impeller connected to a shaft, and a magnetic bearing system supporting the shaft. The magnetic bearing system includes an axial magnetic bearing, which itself includes a first permanent magnet configured to generate a first bias flux, a second permanent magnet axially spaced-apart from the first permanent magnet and configured to generate a second bias flux, and an electromagnet. The electromagnet includes a coil arranged radially outward of the first and second permanent magnets, and the electromagnet is configured to selectively generate either a first control flux or a second control flux to apply a force to the shaft in a first axial direction or second axial direction opposite the first axial direction, respectively.

13 Claims, 6 Drawing Sheets

(58) Field of Classification Search
USPC .......................................................... 310/90.5
See application file for complete search history.

(56) References Cited

U.S. PATENT DOCUMENTS

| | | |
|---|---|---|
| 6,111,333 A | 8/2000 | Takahashi et al. |
| 6,463,748 B1 | 10/2002 | Benedict et al. |
| 6,581,399 B2 | 5/2003 | Benedict et al. |
| 6,872,050 B2 | 3/2005 | Nenstiel |
| 7,326,027 B1 | 2/2008 | Skoch et al. |
| 9,945,418 B1 * | 4/2018 | Allaire ..................... H02K 7/09 |
| 2005/0076656 A1 | 4/2005 | Bodell, II et al. |
| 2005/0198956 A1 | 9/2005 | Fremerey et al. |
| 2007/0164626 A1 | 7/2007 | Taniguchi et al. |
| 2007/0224032 A1 | 9/2007 | Gu et al. |
| 2008/0115527 A1 | 5/2008 | Doty et al. |
| 2009/0046963 A1 | 2/2009 | Ozaki et al. |
| 2010/0005763 A1 | 1/2010 | Bloom |
| 2011/0048046 A1 | 3/2011 | Sommer et al. |
| 2012/0100011 A1 | 4/2012 | Sommer et al. |
| 2014/0256599 A1 | 9/2014 | Devitt et al. |

OTHER PUBLICATIONS

International Search Report and Written Opinion for PCT/2011/051504 dated Feb. 23, 2012.

* cited by examiner

AXIAL MAGNETIC BEARING FOR CENTRIFUGAL REFRIGERANT COMPRESSOR

TECHNICAL FIELD

This disclosure relates to an axial magnetic bearing for a centrifugal refrigerant compressor, and a corresponding system and method.

BACKGROUND

Centrifugal refrigerant compressors are used to circulate refrigerant to a chiller via a refrigerant loop. Some centrifugal refrigerant compressors include impellers supported on a rotor shaft by a magnetic bearing system, which typically includes radial and axial magnetic bearings. In some compressors, radial magnetic bearings apply radial forces to the shaft, and axial magnetic bearings apply axial magnetic forces to the shaft.

SUMMARY

A centrifugal refrigerant compressor system according to an exemplary aspect of the present disclosure includes, among other things, an impeller connected to a shaft, and a magnetic bearing system supporting the shaft. The magnetic bearing system includes an axial magnetic bearing, which itself includes a first permanent magnet configured to generate a first bias flux, a second permanent magnet axially spaced-apart from the first permanent magnet and configured to generate a second bias flux, and an electromagnet. The electromagnet includes a coil arranged radially outward of the first and second permanent magnets, and the electromagnet is configured to selectively generate either a first control flux or a second control flux to apply a force to the shaft in a first axial direction or second axial direction opposite the first axial direction, respectively.

In a further non-limiting embodiment of the foregoing system, the system includes a pole including a first pole and a second pole, wherein the first permanent magnet is supported by the first pole and the second permanent magnet is supported by the second pole.

In a further non-limiting embodiment of any of the foregoing systems, the first pole is axially spaced-apart from the second pole by a gap, and a disc formed of magnetic material and configured to rotate with the shaft projects into the gap.

In a further non-limiting embodiment of any of the foregoing systems, the first pole includes a first slot receiving the first permanent magnet and the second pole includes a second slot receiving the second permanent magnet.

In a further non-limiting embodiment of any of the foregoing systems, the first permanent magnet and the second permanent magnets are shaped substantially as rectangular cuboids.

In a further non-limiting embodiment of any of the foregoing systems, the first slot extends axially through an entirety of the first pole and the second slot extends axially through an entirety of the second pole.

In a further non-limiting embodiment of any of the foregoing systems, the first permanent magnet is one of a plurality of first permanent magnets supported by the first pole, the first slot is one of a plurality of first slots formed in the first pole, each of the first permanent magnets are arranged in a respective one of the first slots, the second permanent magnet is one of a plurality of second permanent magnets supported by the second pole, the second slot is one of a plurality of second slots formed in the second pole, and each of the second permanent magnets are arranged in a respective one of the second slots.

In a further non-limiting embodiment of any of the foregoing systems, the first slots are circumferentially spaced-apart from one another by respective bridges of the first pole, and the second slots are circumferentially spaced-apart from one another by respective bridges of the second pole.

In a further non-limiting embodiment of any of the foregoing systems, the bridges of the first and second pole are magnetically saturated.

In a further non-limiting embodiment of any of the foregoing systems, a magnetic flux density of the bridges of the first and second poles is greater than or equal to 1.5 Teslas (T).

In a further non-limiting embodiment of any of the foregoing systems, the first pole includes an inner pole and an outer pole, the first permanent magnet is one of a plurality of first permanent magnets radially between the inner and outer poles of the first pole, the second pole includes an inner pole and an outer pole, and the second permanent magnet is one of a plurality of second permanent magnets radially between the inner and outer poles of the second pole.

In a further non-limiting embodiment of any of the foregoing systems, the first permanent magnet is one of a plurality of first permanent magnets connected to a radially innermost surface of the first pole, and the second permanent magnet is one of a plurality of second permanent magnets connected to the radially innermost surface of the second pole.

In a further non-limiting embodiment of any of the foregoing systems, the system includes a sensor configured to produce an output indicative of an axial position of the shaft, and a controller configured to receive the output and to selectively issue an instruction activating the electromagnet.

A method according to an exemplary aspect of the present disclosure includes, among other things, activating an electromagnet of an axial magnetic bearing of a centrifugal refrigerant compressor to apply an axial force to a shaft of the centrifugal refrigerant compressor. The axial magnetic bearing also includes a first permanent magnet configured to generate a first bias flux, a second permanent magnet axially spaced-apart from the first permanent magnet and configured to generate a second bias flux, and the electromagnet includes a coil arranged radially outward of the first and second permanent magnets. The step of activating the electromagnet includes generating either a first control flux or a second control flux to apply a force to the shaft in a first axial direction or second axial direction opposite the first axial direction, respectively.

In a further non-limiting embodiment of the foregoing method, the first permanent magnet is one of a plurality of radially aligned first permanent magnets circumferentially spaced-apart from one another by a respective magnetically saturated bridge, and the second permanent magnet is one of a plurality of radially aligned second permanent magnets circumferentially spaced-apart from one another by a respective magnetically saturated bridge.

DETAILED DESCRIPTION

Figure 1:
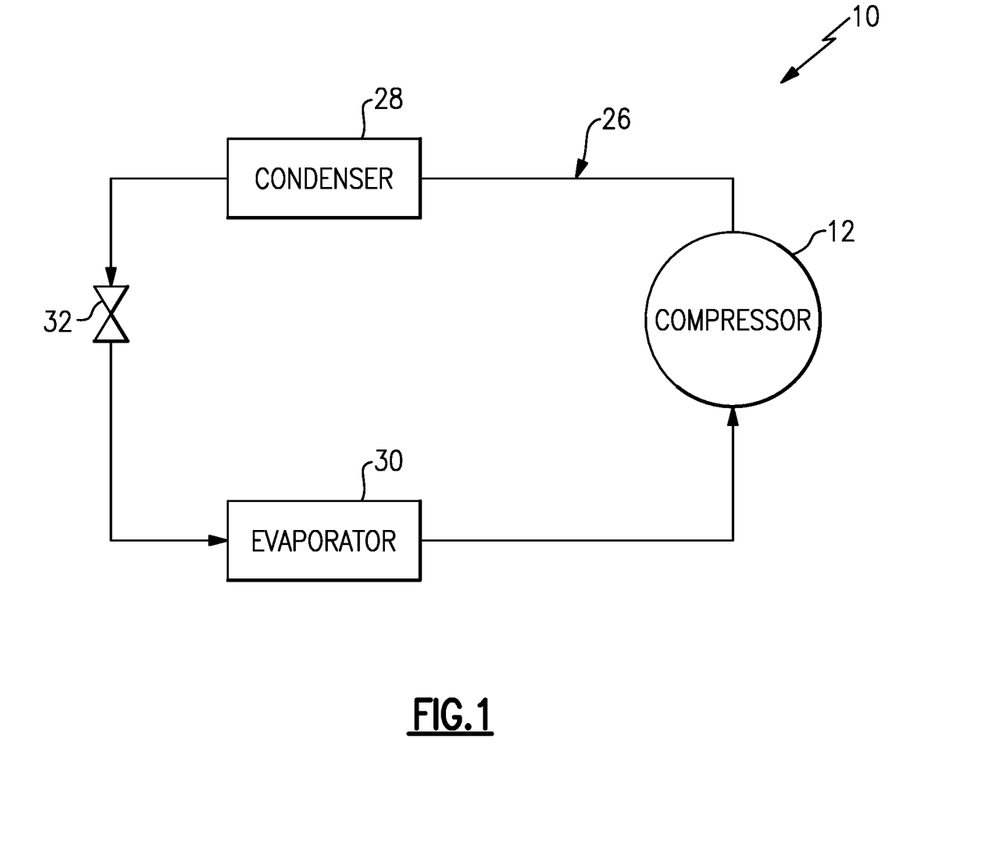
FIG. 1 is a highly schematic view of a refrigerant system having a centrifugal refrigerant compressor.
Figure 2:
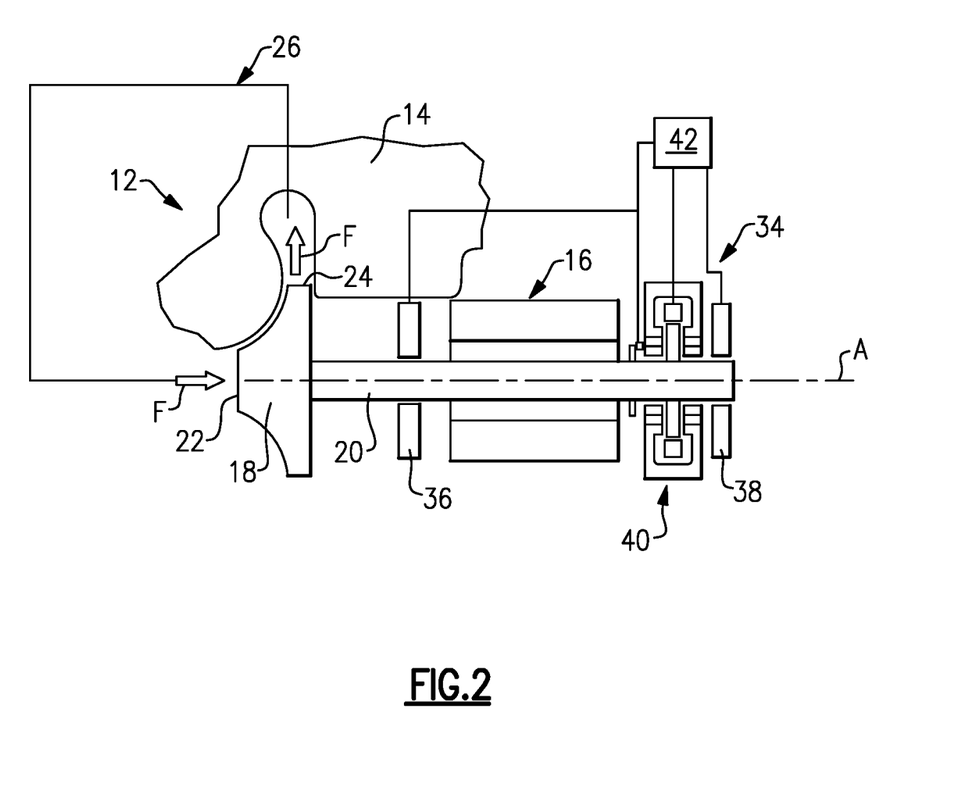
FIG. 2 is a highly schematic view of a centrifugal refrigerant compressor with a shaft-mounted impeller supported by radial and axial magnetic bearings.

Referring to FIGS. 1 and 2, a refrigeration system 10 includes a centrifugal refrigerant compressor 12 ("compressor 12") for circulating a flow of fluid F, which in this example is refrigerant. An example compressor 12 is shown in more detail in FIG. 2, and includes a housing 14 within which an electric motor 16 is arranged. While in this example the compressor 12 is a centrifugal compressor, this disclosure extends to other applications. The housing 14 is schematically depicted and may comprise one or more pieces. The electric motor 16 rotationally drives an impeller 18 via a shaft 20 about a central axis A ("axis A") to compress the refrigerant.

The impeller 18 includes an inlet 22 and an outlet 24. As shown in FIG. 2, the inlet 22 is arranged axially, and the outlet 24 is arranged radially. Although only one impeller is illustrated, the compressor 12 can include multiple impellers.

The compressor 12 is in fluid communication with a refrigerant loop 26 that circulates refrigerant to a load, such as a chiller. As shown in FIG. 1, the refrigerant loop 26 includes a condenser 28, an evaporator 30, and an expansion device 32. While a particular example of the refrigerant system 10 is shown in FIG. 1, this application extends to other refrigerant system configurations. Further, this disclosure extends to compressors that are used relative to refrigerant loops that do not contain a chiller. For example, the refrigerant loop 26 can include an economizer downstream of the condenser 28 and upstream of the expansion device 32.

An oil-free bearing arrangement is provided for support of the shaft 20 so that oil-free refrigerant can be used to thermally manage (i.e., cool) the compressor 12, namely the electric motor 16. In the example, the shaft 20 is rotationally supported relative to the housing 14 by a magnetic bearing assembly 34. The magnetic bearing assembly 34, in this example, includes two radial bearings 36, 38, which may or may not be magnetic, configured to support and/or adjust a radial position of the shaft 20. The term "radial" is used herein with reference to the axis A and is generally up-and-down in FIG. 2. This disclosure is not limited to any particular details of the radial magnetic bearings 36, 38. Further, this disclosure could be used with any type of radial bearings, and is not limited to use with radial magnetic bearings. The magnetic bearing assembly 34 further includes an axial magnetic bearing 40 configured to support and/or adjust an axial position of the shaft 20.

A controller 42 communicates with the magnetic bearing assembly 34, and in particular receives signals from components of the magnetic bearing assembly 34 and is configured to provide instructions to the components of the magnetic bearing assembly 34. In particular, the controller 42 is configured to selectively issue instructions to activate one or more electromagnets associated with the radial and/or axial magnetic bearings 36, 38, 40. In response to those instructions, the magnetic bearing assembly 34 creates a magnetic field levitating the shaft 20 and controls its characteristics, including steadying the shaft 20 by continually monitoring and adjusting the radial and/or axial position of the shaft 20, during operation of the compressor 12.

The controller 42 is depicted schematically, and may include one or more controllers that are located remotely from or near to one another. The controller 42 may include hardware and/or software. The controller 42 may be electrically connected to the various components of the magnetic bearing assembly 34 via wired and/or wired connections. The controller 42 may also be electrically connected to, and be configured to receive signals from and send instructions to, other components of the compressor 12 other than the magnetic bearing assembly 34.

Figure 3:
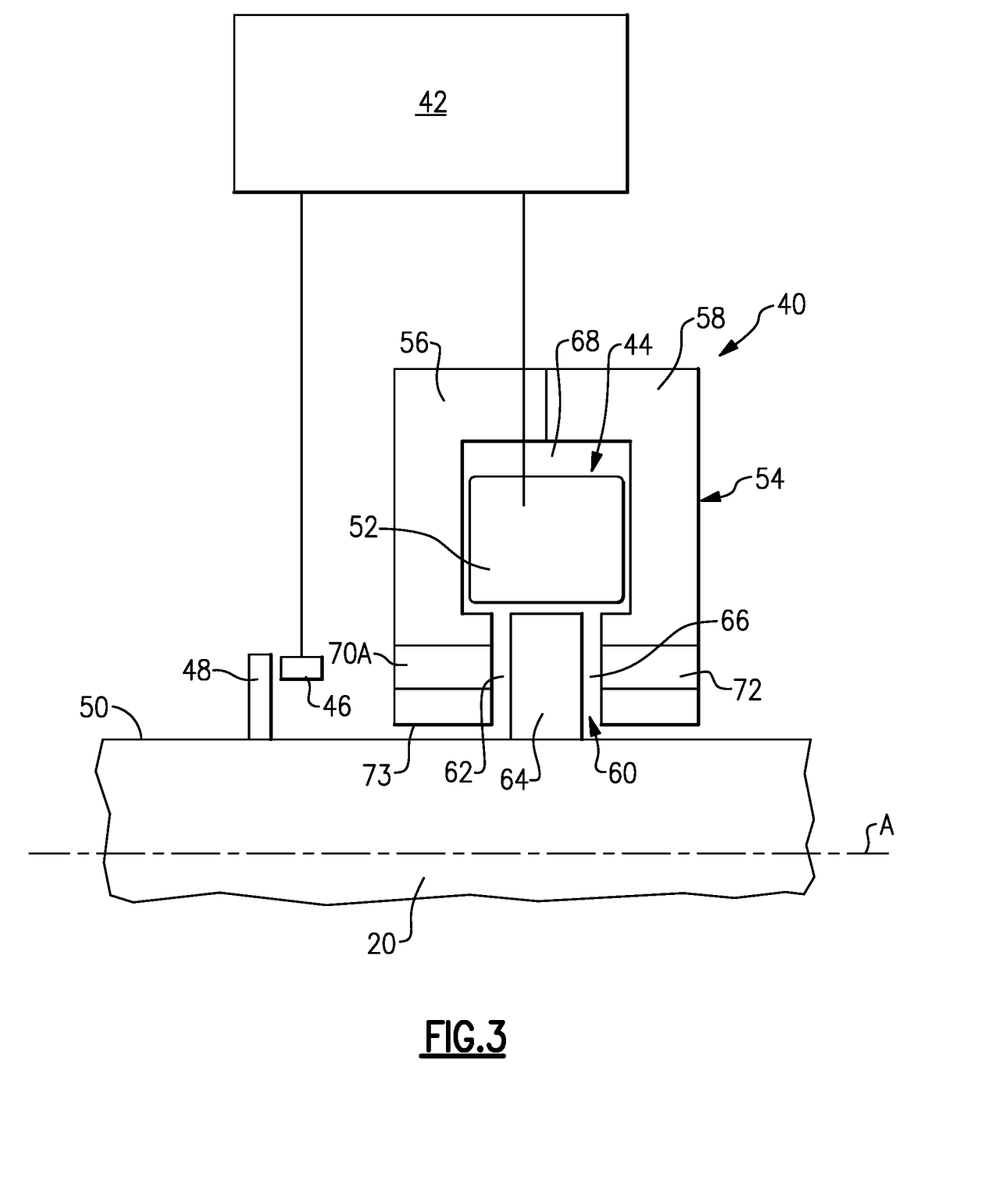
FIG. 3 is a schematic view of an example axial magnetic bearing arrangement.

FIG. 3 is a partial cross-sectional view schematically illustrating an example arrangement of the axial magnetic bearing 40 in more detail. In FIG. 3, the controller 42 is electrically connected to an electromagnet 44 of the axial magnetic bearing 40 and a position sensor 46. The position sensor 46 is configured to generate a signal indicative of the axial position of the shaft 20 for control feedback system and vibration monitoring.

In the illustrated example, the position sensor 46 is configured to detect the axial position shaft 20 by sensing a distance between the position sensor 46 and a tab 48 projecting radially outward from an outer surface 50 of the shaft 20. The tab 48 is a sensor target in one example. In this example, the controller 42 uses information from the position sensor 46 to control the force generated by the electromagnet 44 by controlling the electric current flowing through a coil 52 of the electromagnet 44. Instead of the position sensor 46 and tab 48, the controller 42 could alternatively use other information indicative of the axial position of the shaft. The position sensor 46 can be any known component configured to generate a signal that can be interpreted by the controller 42 and corresponds to a distance between the position sensor 46 and tab 48. The controller 42 is also in communication with or includes a voltage or current source (not shown), in order to provide a desired electric current to the electromagnet 44, as will be discussed below.

The axial magnetic bearing 40 in this example includes a pole assembly 54. In one example, the pole assembly 54 includes a first pole 56 and a second pole 58 attached to the first pole 56. The first and second poles 56, 58 are only partially illustrated in the figures. It should be understood that the first and second poles 56, 58 extend circumferentially about the axis A. While separate first and second poles 56, 58 are shown, the first and second poles could be integrally formed as one seamless structure.

The first and second poles 56, 58 are formed of a magnetic material, such as steel, so that magnetic flux can pass therethrough. In this regard, the first and second poles 56, 58 may be referred to as magnetic poles or stators. The first and second poles 56, 58 are attached to one another using known attachment techniques, such as using fasteners. When attached, the first and second poles 56, 58 define a radially-extending gap 60 therebetween. The gap 60 is open facing the shaft 20. Adjacent the shaft 20, the gap 60 includes a first axial gap 62 on a first side of a disc 64 projecting radially outward from the outer surface 50 of the shaft 20, and a second axial gap 66 on a second side of the disc 64 opposite the first side. The disc 64 is made of a magnetic material in this example, again so that magnetic flux may pass therethrough. Radially outward of the first and second axial gaps 62, 66 and the disc 64, the gap 60 includes a cavity 68 containing the coil 52 of the electromagnet 44. The first and second poles 56, 58 contact one another at a radially outer location to provide a radial outer boundary of the gap 60 and the cavity 68.

Figure 4:
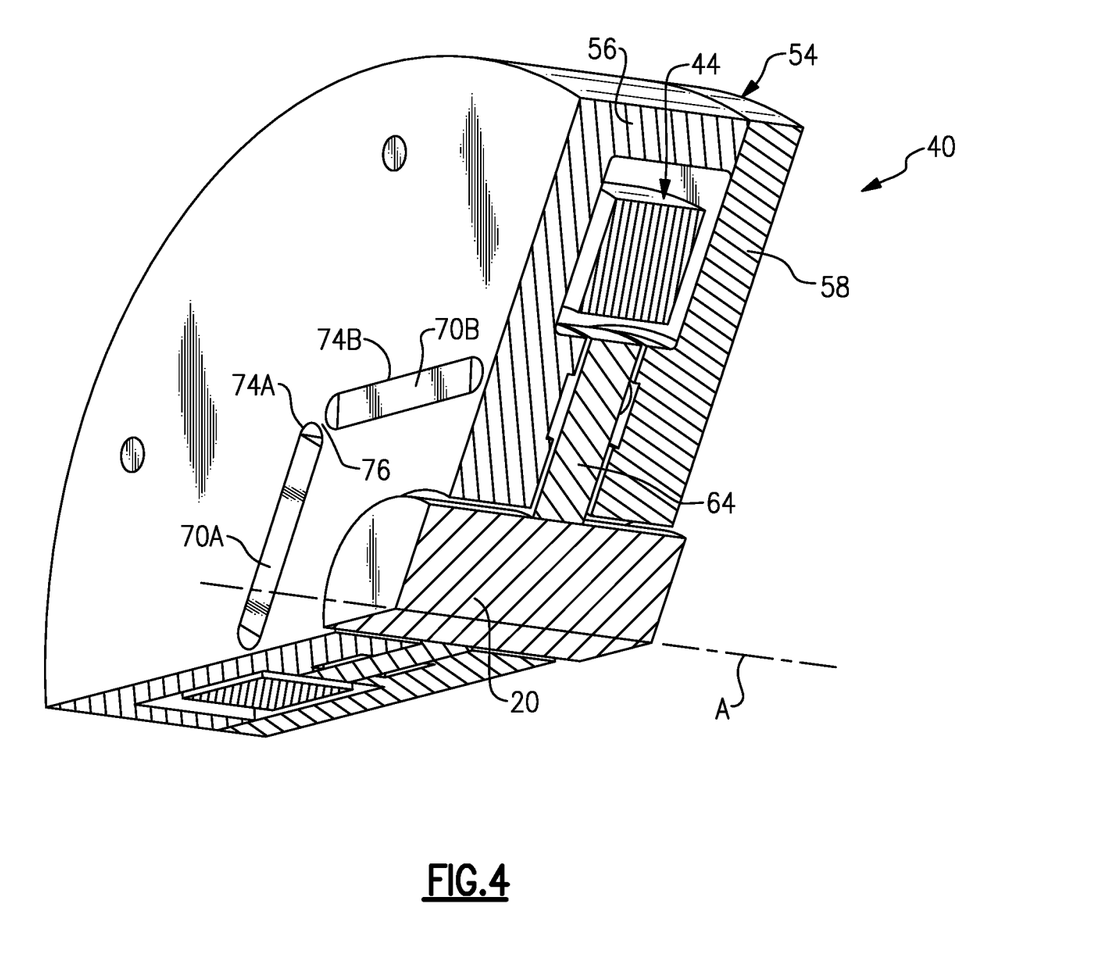
FIG. 4 is a sectioned, perspective view of the example axial magnetic bearing arrangement of FIG. 3.

The axial magnetic bearing 40, in this example, includes a plurality of first permanent magnets and a plurality of second permanent magnets in the first pole 56 and second pole 58 and adjacent the first and second gaps 62, 66, respectively. FIG. 3 illustrates a first permanent magnet 70A. An additional first permanent 70B is illustrated in FIG. 4. A second permanent magnet 72 is shown in FIG. 3. The first and second permanent magnets are arranged in a respective one of the first and second poles 56, 58, and are spaced radially outward of a radially innermost surface 73 of the pole assembly 54, in this example, and are also spaced radially inward of the cavity 68.

Each of the first permanent magnets 70A, 70B are substantially radially aligned and are circumferentially spaced-apart from one another about the axis A. Likewise, the second permanent magnets are substantially radially aligned with one another and with the first permanent magnets, and are circumferentially spaced-apart from one another about the axis A. Only two of the first permanent magnets 70A, 70B are shown in FIG. 4. In one example, there are six first permanent magnets extending circumferentially about the axis A. In that example, there are an equal number of similarly arranged second permanent magnets. This disclosure is not limited to a particular number of magnets.

With reference to FIG. 4, for example, the first pole 56 includes a plurality of first slots 74A, 74B which extend axially through an entirety of the first pole 56 adjacent the first gap 62, and receive respective first permanent magnets 70A, 70B. The first permanent magnets 70A, 70B are shaped substantially as rectangular cuboids. The slots 74A, 74B, are similarly shaped but with rounded ends for ease of machining. The slots 74A, 74B, for example, may be milled into the first pole 56. Further, adjacent slots 74A, 74B are spaced-apart by a bridge 76, which is a section of the first pole 56 circumferentially between adjacent permanent magnets. The second pole 58 includes similarly arranged slots configured to receive the second permanent magnets, including bridges circumferentially between those slots.

Figure 5:
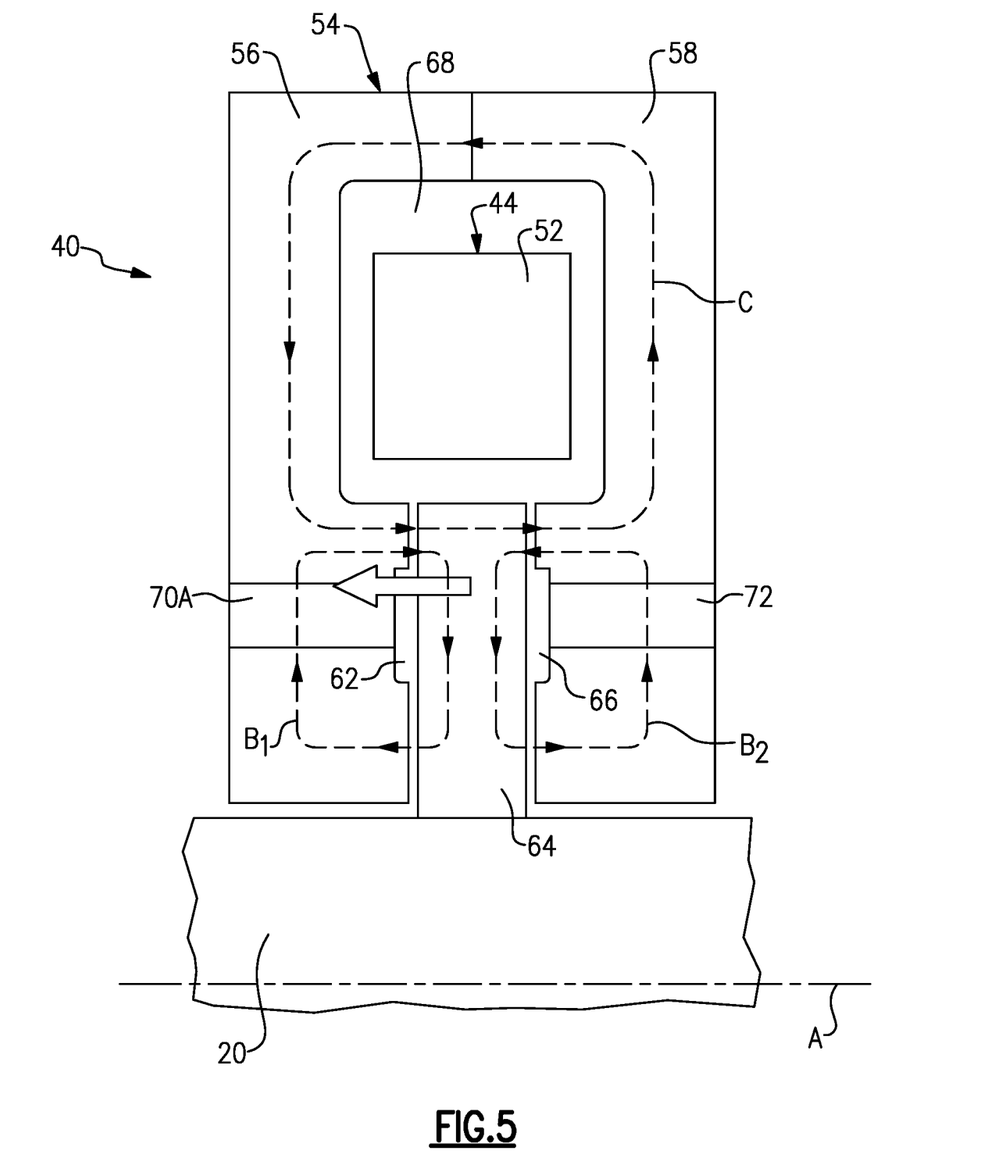
FIG. 5 is a schematic view of the example axial magnetic bearing, such as that of FIGS. 3 and 4, and illustrates example bias and control fluxes.

With reference to FIG. 5, each of the first permanent magnets is configured to generate a first bias flux $B_1$, and each of the second permanent magnets is configured to generate a second bias flux $B_2$. Only one of each of the first and second permanents 70A, 72 are visible in FIG. 5, but each of the first and second permanent magnets generate a magnetic flux along a vector, represented graphically as first and second bias fluxes $B_1$ and $B_2$ in FIG. 5. The first and second bias fluxes $B_1$, $B_2$ are substantially constant due to the nature of the first and second permanent magnets. While the first and second bias fluxes $B_1$, $B_2$ do not pass through the shaft 20 in FIG. 5, if the shaft 20 is made of magnetic material the first and second bias fluxes $B_1$, $B_2$ extend further radially inward and may pass partially through the shaft 20.

If a signal from the position sensor 46 indicates that an axial position of the shaft 20 needs to be adjusted, for example, the controller 42 issues an instruction to activate the electromagnet 44 by instructing a current source, for example, to cause current to flow through the coil 52. Depending on the level and direction of electric current flowing through the coil 52, the magnetic field generated by the electromagnet 44 varies. When the electromagnet 44 is activated, the electromagnet 44 generates a control flux C. Depending on the direction of the current flowing through the coil 52, the control flux C can either be a first control flux or a second control flux to offset either the first bias flux $B_1$ or the second bias flux $B_2$, respectively, and to apply a force to the shaft 20 in either a first axial direction (i.e., to the left, in FIG. 5) or second axial direction opposite the first axial direction (i.e., to the right, in FIG. 5), respectively. In other words, the control flux C prevents unintended axial movements of the shaft 20.

In the example of FIG. 5, the control flux C takes the form of the aforementioned first control flux, which extends in a counter-clockwise direction around the coil 52. As such, in the first gap 62, the axially-extending component of the control flux C is in the same direction as the axially-extending component first bias flux $B_1$, and in the second gap 66, the opposite is true. Namely, the axially-extending component of the control flux C is in an opposite direction as the axially-extending component of the second bias flux $B_2$. As such, the net force on the disc 64, and in turn the shaft 20, is an attraction force moving the disc to the left, relative to FIG. 5. If the current through the coil 52 were reversed, the opposite would occur, and the control flux C would take the form of the aforementioned second control flux, extending in a clockwise direction about the coil 52. In turn, the disc 64 and shaft 20 would be attracted to the right.

In a particular aspect of this disclosure, the bridges 76 of the first and second pole 56, 58 are magnetically saturated so as to resist further magnetization and direct the first and second bias fluxes $B_1$, $B_2$ as shown in FIG. 5, as opposed to in a circumferential direction through the respective first and second poles 56, 58. Magnetic saturation in this context refers to a state when an increase in applied external magnetic field cannot increase the magnetization of the saturated element any further, so the total magnetic flux density essentially levels off. In a particular example, adjacent magnets are arranged relative to the bridges such that a magnetic flux density of the bridges of the first and second poles are greater than or equal to 1.5 Teslas (T). Such a saturation level prevents flux leakage circumferentially through the first and second poles 56, 58 without requiring wholesale removal of the bridges, which would require a slightly more complicated and potentially more costly manufacturing technique.

Figure 6:
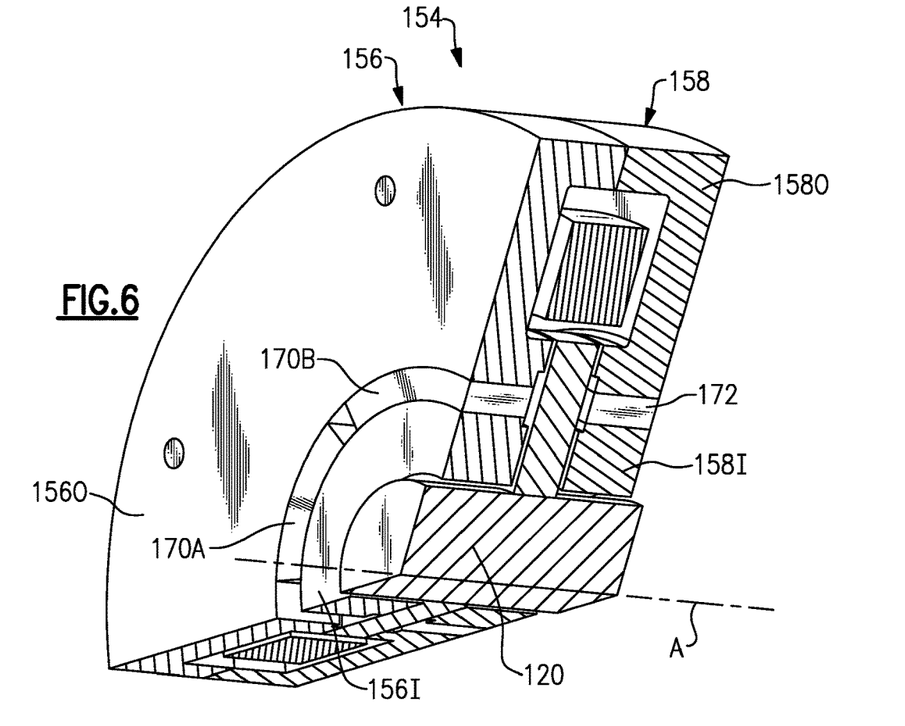
FIG. 6 is a sectioned, perspective view of another example axial magnetic bearing arrangement.
Figure 7:
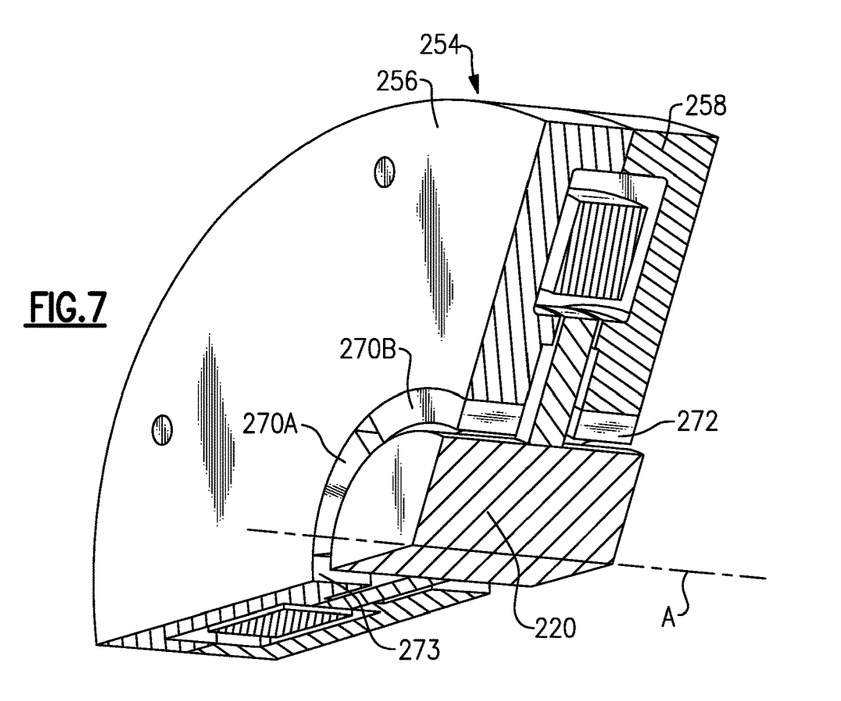
FIG. 7 is a sectioned, perspective view of yet another example axial magnetic bearing arrangement.

FIGS. 6 and 7 illustrate other example axial magnetic bearings for a compressor which do not include slots and/or bridges. In these figures, the example axial magnetic bearings include similar reference numerals to those used above with like components preappended with a "1" or "2" respectively. The embodiments of FIGS. 6 and 7 may, in some respects, be slightly more difficult to manufacture or more costly than the above-discussed embodiment, but they do not includes slots which need to be separately machined and bridge saturation is not a concern because magnetic material is not present in the circumferential space between adjacent permanent magnets.

In FIG. 6, the pole assembly 154 includes first and second poles 156, 158 similar to the first and second poles 56, 58, except each of the first and second poles 156, 158 includes an inner pole 156I, 158I and an outer pole 156O, 158O formed separately from the respective inner pole 156I, 158I. As shown in FIG. 6, the first permanent magnets 170A, 170B are arranged radially between the inner and outer poles 156I, 156O of the first pole 156. The second permanent magnets, only one of which is visible in FIG. 6 (the second permanent magnet 172), are likewise arranged radially between inner and outer poles 158I, 158O. The outer poles 156O, 158O may be active poles that produce force, and the inner poles 156I, 158I may be passive poles that do not produce force and instead serve as a return path for the bias flux.

In another embodiment, shown in FIG. 7, the first permanent magnets (i.e., 270A, 270B) and second permanent magnets (i.e., 272) are connected to a radially innermost surface 274 of the pole assembly 254, namely the radially innermost surfaces of the respective first and second poles 256, 258. In FIGS. 6 and 7, the permanent magnets are curved to match the curvature of the respective pole, unlike in the previous embodiment where the permanent magnets resemble rectangular cuboids received in similarly shaped slots.

It should be understood that terms such as "axial," "radial," and "circumferential" are used above with reference to the normal operational attitude of the compressor. Further, these terms have been used herein for purposes of explanation, and should not be considered otherwise limiting. Terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A centrifugal refrigerant compressor system, comprising:
   an impeller connected to a shaft;
   a magnetic bearing system supporting the shaft, wherein the magnetic bearing system includes an axial magnetic bearing comprising:
      a first permanent magnet configured to generate a first bias flux;
      a second permanent magnet axially spaced-apart from the first permanent magnet and configured to generate a second bias flux;
      an electromagnet including a coil arranged radially outward of the first and second permanent magnets, wherein the electromagnet is configured to selectively generate either a first control flux or a second control flux to apply a force to the shaft in a first axial direction or second axial direction opposite the first axial direction, respectively; and
      a first pole and a second pole, wherein the first permanent magnet is supported by the first pole and the second permanent magnet is supported by the second pole,
   wherein the first pole includes a first slot receiving the first permanent magnet and the second pole includes a second slot receiving the second permanent magnet wherein the first permanent magnet is one of a plurality of first permanent magnets supported by the first pole,
   wherein the first slot is one of a plurality of first slots formed in the first pole,
   wherein each of the first permanent magnets are arranged in a respective one of the first slots,
   wherein the second permanent magnet is one of a plurality of second permanent magnets supported by the second pole,
   wherein the second slot is one of a plurality of second slots formed in the second pole, and
   wherein each of the second permanent magnets are arranged in a respective one of the second slots.

2. The system as recited in claim 1, wherein:
   the first pole is axially spaced-apart from the second pole by a gap, and
   a disc formed of magnetic material and configured to rotate with the shaft projects into the gap.

3. The system as recited in claim 1, wherein the first permanent magnets and the second permanent magnets are shaped substantially as rectangular cuboids.

4. The system as recited in claim 1, wherein the first slot extends axially through an entirety of the first pole and the second slot extends axially through an entirety of the second pole.

5. The system as recited in claim 1, wherein:
   the first slots are circumferentially spaced-apart from one another by respective bridges of the first pole, and
   the second slots are circumferentially spaced-apart from one another by respective bridges of the second pole.

6. The system as recited in claim 5, wherein the bridges of the first and second pole are magnetically saturated.

7. The system as recited in claim 6, wherein a magnetic flux density of the bridges of the first and second poles is greater than or equal to 1.5 Teslas (T).

8. The system as recited in claim 1, further comprising:
   a sensor configured to produce an output indicative of an axial position of the shaft; and
   a controller configured to receive the output and to selectively issue an instruction activating the electromagnet.

9. A centrifugal refrigerant compressor system, comprising:
   an impeller connected to a shaft;
   a magnetic bearing system supporting the shaft, wherein the magnetic bearing system includes an axial magnetic bearing comprising:
      a first permanent magnet configured to generate a first bias flux;
      a second permanent magnet axially spaced-apart from the first permanent magnet and configured to generate a second bias flux;
      an electromagnet including a coil arranged radially outward of the first and second permanent magnets, wherein the electromagnet is configured to selectively generate either a first control flux or a second control flux to apply a force to the shaft in a first axial direction or second axial direction opposite the first axial direction, respectively; and
      a first pole and a second pole, wherein the first permanent magnet is supported by the first pole and the second permanent magnet is supported by the second pole,
   wherein the first pole includes a first slot receiving the first permanent magnet and the second pole includes a second slot receiving the second permanent magnet, wherein the first permanent magnet and the second permanent magnets are shaped substantially as rectangular cuboids, wherein the first pole includes an inner pole and an outer pole, wherein the first permanent magnet is one of a plurality of first permanent magnets radially between the inner and outer poles of the first pole, wherein the second pole includes an inner pole and an outer pole, and wherein the second permanent magnet is one of a plurality of second permanent magnets radially between the inner and outer poles of the second pole.

10. A centrifugal refrigerant compressor system, comprising:
an impeller connected to a shaft;
a magnetic bearing system supporting the shaft, wherein the magnetic bearing system includes an axial magnetic bearing comprising:
 a first permanent magnet configured to generate a first bias flux;
 a second permanent magnet axially spaced-apart from the first permanent magnet and configured to generate a second bias flux;
 an electromagnet including a coil arranged radially outward of the first and second permanent magnets, wherein the electromagnet is configured to selectively generate either a first control flux or a second control flux to apply a force to the shaft in a first axial direction or second axial direction opposite the first axial direction, respectively; and
 a first pole and a second pole, wherein the first permanent magnet is supported by the first pole and the second permanent magnet is supported by the second pole,
wherein the first permanent magnet is one of a plurality of first permanent magnets connected to a radially innermost surface of the first pole, and
wherein the second permanent magnet is one of a plurality of second permanent magnets connected to the radially innermost surface of the second pole.

11. A method, comprising:
activating an electromagnet of an axial magnetic bearing of a centrifugal refrigerant compressor to apply an axial force to a shaft of the centrifugal refrigerant compressor, wherein the axial magnetic bearing further comprises:
 a first permanent magnet configured to generate a first bias flux;
 a second permanent magnet axially spaced-apart from the first permanent magnet and configured to generate a second bias flux;
 wherein the electromagnet includes a coil arranged radially outward of the first and second permanent magnets, and the step of activating the electromagnet includes generating either a first control flux or a second control flux to apply a force to the shaft in a first axial direction or second axial direction opposite the first axial direction, respectively; and
 a first pole and a second pole, wherein the first permanent magnet is supported by the first pole and the second permanent magnet is supported by the second pole,
wherein the first pole includes a first slot receiving the first permanent magnet and the second pole includes a second slot receiving the second permanent magnet
wherein the first permanent magnet is one of a plurality of first permanent magnets supported by the first pole,
wherein the first slot is one of a plurality of first slots formed in the first pole,
wherein each of the first permanent magnets are arranged in a respective one of the first slots,
wherein the second permanent magnet is one of a plurality of second permanent magnets supported by the second pole,
wherein the second slot is one of a plurality of second slots formed in the second pole, and
wherein each of the second permanent magnets are arranged in a respective one of the second slots.

12. The method as recited in claim 11, wherein the first permanent magnets are circumferentially spaced-apart from one another by a respective magnetically saturated bridge, and the second permanent magnets are circumferentially spaced-apart from one another by a respective magnetically saturated bridge.

13. The method as recited in claim 11, wherein the first and second permanent magnets are rectangular cuboids.

* * * * *